United States Patent Office 3,677,972
Patented July 18, 1972

3,677,972
HYDROCRACKING CATALYST

Louis C. Gutberlet, Crown Point, and Ralph J. Bertolacini, Chesterton, Ind., assignors to Standard Oil Company, Chicago, Ill.
No Drawing. Filed Apr. 7, 1969, Ser. No. 814,155
Int. Cl. B01j 11/40
U.S. Cl. 252—455 Z      11 Claims

ABSTRACT OF THE DISCLOSURE

Disclosed is a hydrocracking catalyst consisting essentially of an ultrastable, large pore, crystalline aluminosilicate material containing less than about 1% alkali metal and having deposited thereon a hydrogenation component selected from the metals, oxides, or sulfides of the Group VIII elements of the Periodic Table. The catalyst may additionally contain a metal, oxide or sulfide of a Group VI–B element.

BACKGROUND OF THE INVENTION

This invention pertains to a catalytic composition for use in hydrocracking processes, which composition contains an ultrastable, large pore, crystalline aluminosilicate material and a Group VIII metal, metal oxide, or sulfide and a Group VI–B metal, metal oxide or sulfide. A considerable number of materials have heretofore been proposed as catalysts for hydrocracking hydrocarbon oils. In the past few years much attention has been devoted to using crystalline aluminosilicates as an element in such hydrocracking catalysts. In general, the crystalline aluminosilicates are used in combination with a porous matrix such as silica-alumina. In some cases the co-catalytic activity of the crystalline aluminosilicate material and the acidic porous matrix with various metallic promoters has been found to be an effective catalyst material.

SUMMARY OF THE INVENTION

Briefly, in accordance with this invention there is provided an improved catalyst for hydrocracking nitrogen-containing gas oil. The catalyst consisting essentially of an ultrastable, large pore, crystalline aluminosilicate material containing less than about 1% alkali metal being deposited thereon, a metal, metal oxide, or sulfide of the Group VIII elements of the Periodic Table. Such deposition may be by any suitable means such as impregnation of the metal, metal oxide, or sulfide on the molecular sieve support. In addition, the catalyst may include a metal, metal oxide, or sulfide selected from the Group VI–B elements of the Periodic Table.

We have found that an ultrastable, large pore, crystalline aluminosilicate material containing less than about 1% alkali metal provides the most desirable catalyst base. Preferably, the base should contain less than about 0.2% alkali metal. The base should have deposited thereon from about 0.1 to 10 weight percent of the Group VIII metal, metal oxide, or sulfide and may contain up to 25 weight percent of the Group VI–B metal, metal oxide, or sulfide. Group VI–B elements which have been found to be most catalytically effective are chromium, molybdenum and/or tungsten. The most effective Group VIII elements are cobalt and nickel.

DETAILED DESCRIPTION

A preferred hydrocracking catalyst consists of an ultrastable, large pore, crystalline aluminosilicate material containing less than 1% alkali metal and having deposited thereon from 0.1 to 5 weight percent of cobalt and less than about 25 weight percent molybdenum in the form of molybdena. The catalyst of this invention is not suspended in any co-catalytic porous matrix but is, along with the aforesaid Group VIII and Group VI–B metals, oxides, or sulfides, the sole catalytic agent.

Certain naturally occurring and synthetic aluminosilicate materials such as faujasite, chabazite, X-type and Y-type and L-type aluminosilicate materials are commercially available and are effective cracking components. These aluminosilicate materials may be characterized and adequately defined by their X-ray diffraction patterns and compositions. Characteristics of such aluminosilicate materials and methods for preparing them have been presented in the chemical art. They exist as a network of relatively small cavities which are interconnected by numerous pores which are smaller than the cavities. These pores have an essentially uniform diameter at the narrowest cross-section. Basically, the network of cavities is a fixed three-dimensional and ionic network of silica and alumina tetrahedra. These tetrahedra are cross-linked by the sharing of oxygen atoms. Cations are included in the crystalline structure to preserve the electrovalence of the tetrahedra. Examples of such cations are metal ions, ammonium ions, and hydrogen ions. One cation may be exchanged either entirely or partially for another by means of techniques which are well known to those skilled in the art.

The ultrastable, large pore, crystalline aluminosilicate material employed in the catalyst of this invention is extremely important. It is an ultrastable material, that is, it is stable to exposure to elevated temperatures and stable to repeated wetting-drying cycles. An example of ultrastable, large pore, crystalline aluminosilicate material that is employed in the catalyst of this invention is Z–14 ultrastable zeolite, which is described in U.S. Pat. 3,293,192. Its X-ray diffraction pattern along with the description of the method of measurement is presented in U.S. Pat. 3,293,192.

The stability of ultrastable, large pore, crystalline aluminosilicate material may be demonstrated by its surface area after calcination at 1725° F. After a two-hour calcination at 1725° F., a surface area that is greater than 150 square meters per gram (m.²/gm.) is retained. Moreover, the stability is further demonstrated by its surface area after a steam treatment with an atmosphere of 25% steam at a temperature of 1525° F. for 16 hours. The surface area after this steam treatment is greater than 200 m.²/gm.

The ultrastable, large pore, crystalline aluminosilicate material exhibits extremely good stability towards wetting, which is defined as that ability of a particular aluminosilicate material to retain surface area or nitrogen adsorption capacity after contact with water or water vapor. A form of the ultrastable, large pore, crystalline aluminosilicate material containing about 2% sodium exhibits a loss in nitrogen adsorption capacity that is less than 2% per wetting when tested for stability to wetting.

The ultrastable, crystalline aluminosilicate material is a large pore material. By large pore material is meant material that has pores which are sufficiently large to permit the passage thereinto of benzene molecules and larger molecules, and the passage therefrom of reaction products. For use in hydrocracking processes, it is preferred to employ a large pore, crystalline aluminosilicate material having a pore size of at least 8 to 10 angstrom units (A.). This ultrastable, large pore, crystalline aluminosilicate material possesses such a pore size.

The cubic unit cell dimensions of ultrastable, large pore, crystalline aluminosilicate material is within the range of about 24.20 A. to about 24.55 A. This range of values is below those values shown in the prior art for X-type, Y-type and decationized aluminosilicates. The hydroxyl infrared bands obtained with the ultrastable, large pore, crystalline aluminosilicate materials include a band near 3750 cm.$^{-1}$, a band near 3700 cm.$^{-1}$, and a band near 3625 cm.$^{-1}$. While the latter two bands appear to be characteristic of the ultrastable, large pore, crystalline aluminosilicate material of the catalytic composition employed in this invention, it is quite possible that they might appear in the infrared spectra of a decationized Y-type aluminosilicate material, if that aluminosilicate material were to be subjected to the proper treatment.

It is believed that the ultrastable, large pore, crystalline aluminosilicate material of the catalyst of this invention can be identified properly by the hydroxyl infrared bands near 3700 cm.$^{-1}$ and near 3625 cm.$^{-1}$, particularly the former, when considered in conjunction with characteristically small cubic unit cell dimension. For example, the identification or description will distinguish the ultrastable, aluminosilicate material from the "high-silica" faujasites described in Dutch patent application 6707192, which have the smaller cubic unit cell but do not exhibit the 3700 cm. $^{-1}$ and 3625 cm.$^{-1}$ infrared bands. While unstable decationized Y-type aluminosilicate materials may provide hydroxyl infrared bands near 3700 cm.$^{-1}$, if they were to receive the proper treatment, they do not exhibit the appropriate smaller cubic unit cell dimension that is characteristic of the ultrastable, large pore, crystalline aluminosilicate material.

The ultrastable, large pore, crystalline aluminosilicate material, as employed in the hydrocracking catalyst of this invention, contains less than 1 weight percent alkali metal such as sodium.

It is believed, therefore, that the ultrastable, large pore, crystalline aluminosilicate material may be adequately and accurately identified, characterized, and described by (1) its cubic unit cell dimension, (2) its specific hydroxyl infrared bands, and (3) its low sodium content. The ultrastable, large pore, crystalline aluminosilicate material used in the hydrocracking catalyst of this invention is not the same material as the hydrogen-form and decationized Y-type aluminosilicate molecular sieve. The ultrastable aluminosilicate material has different cubic unit cell dimensions and different hydroxyl infrared bands. Nevertheless, it is an extremely active catalytic material having the additional benefit of remaining active even after being steamed.

As a preferred catalyst, the ultrastable, large pore, crystalline aluminosilicate material has deposited thereon a suitable hydrogenation component which may be deposited by impregnation or by mixing the ultrastable, large pore, crystalline aluminosilicate material with solutions of the hydrogenation component during manufacture. A preferred hydrogenation component is a mixture of cobalt and molybdenum oxides which provide an especially durable long-life catalyst particularly suited for hydrocracking virgin gas oils containing appreciable quantities of sulfur and nitrogen compounds. Thus the catalyst is desired for use in situations calling for a "one-stage" hydrocracking process. Typically, the catalyst contains from about 0.1 to 5 weight percent cobalt oxide and less than about 25 weight percent molybdenum trioxide (molybdena).

EXPERIMENTS

Catalyst A was a commercially prepared catalyst containing a low alumina (about 13 weight percent alumina), silica-alumina material having suspended in its porous matrix 35 weight percent ultrastable, large pore, crystalline aluminosilicate material. Cobalt and molybdenum had been introduced into this catalyst by means of a solution of cobalt acetate and a solution of ammonium molybdate, respectively. Catalyst A was found to contain about 2.52 weight percent CoO and 9.46 weight percent MoO$_3$.

Catalyst B was prepared by impregnating Davison SMR 5–240 catalyst base with a solution made by dissolving 8.3 g. cobalt acetate and 6.1 g. of ammonium molybdate in 120 ml. of hot water. Davison SMR 5–240 catalyst base is a silica-alumina porous matrix containing about 35 weight percent ultrastable, large pore, crystalline aluminosilicate material similar to that used in the preparation of Catalyst A. After impregnation with the cobalt acetate and ammonium molybdate aqueous solution, the catalyst was dried for 6 hours at 250° F. and pelleted. The pellets were calcined for 6 hours, at 1000° F. The resulting catalyst contained, nominally, 2.5 weight percent CoO and 5 weight percent MoO$_3$.

Catalyst C was prepared from the soda form of Davison ultrastable sieve material. As received, the base material contained about 2.2% sodium. About 250 g. of the Davison ultrastable sieve base were exchanged with a solution of 157 g. ammonium sulfate in 1.5 liters water for about 4 hours at 90° F. The sample was filtered, water-washed and re-exchanged with an ammonium sulfate solution two additional times. After the last exchange, the sample was water-washed to remove the sulfate ion and dried. The sample was then calcined for 2 hours at 1490° F. The resulting base contained about 0.65 weight percent sodium after the above treatment. 92.5 g. of this base material was impregnated with a solution of 6.1 g. ammonium molybdate and 8.4 g. cobalt acetate in 100 ml. of water. The impregnated sample was dried at 250° F. for 6 hours. It was then pelleted and calcined for 4 hours at 1000° F. The resulting catalyst nominally contained 2.5 weight percent CaO and 5 weight percent MoO$_3$.

Catalyst D was prepared using a Linde NaY, SK–40, sieve material exchanged to lower the sodium content. About 600 g. of NaY sieve were exchanged with a solution of 454 g. of ammonium sulfate in 4 liters of water at 90° for 4 hours. The aqueous mixture was filtered and the solids water-washed several times to remove the sodium and excess sulfate ion. After the first exchange, the sodium content in the base was 3.81 weight percent (dry basis). The above procedure was repeated using fresh ammonium sulfate solution and the solid was dried at 250° F. It was then calcined for 3 hours at 1000° F. The sodium content after the second exchange was 2.43 weight percent (dry basis). The base was exchanged for a third time under the same conditions and the resulting sodium content was 0.38 weight percent (dry basis). A final exchange was performed using the identical procedure. After water-washing to remove sodium and sulfate ions, the base was calcined for 3 hours at 1500° F. The sodium content after the last exchange and calcination was 0.19 weight percent. The cubic unit cell dimension of the resulting ultrastable sieve was 24.38 A.

92.5 g. of the exchanged ultrastable, large pore, crystalline aluminosilicate material were impregnated with a solution comprising 8.4 g. cobalt acetate in 50 ml. of water and 6.1 g. ammonium molybdate in 50 ml. water. After drying at 250° F. for 3 hours, the impregnated catalyst was pelleted and calcined for 4 hours at 1000° F. The final catalyst had a nominal composition of 2.5 weight percent CoO and 5 weight percent MoO$_3$.

Catalyst E was prepared using the same low sodium ultrastable, large pore, crystalline aluminosilicate base material of Catalyst D. 87.5 g. of the base were impregnated with a solution of 8.4 g. cobalt acetate in 50 ml. of water and 12.1 g. ammonium molybdate in 50 ml. of water. After impregnation, the catalyst was dried at 250° F., pelleted and calcined for 4 hours at 1000° F. The nominal cobalt oxide and molybdena composition of Catalyst E was 2.5 weight percent CoO and 10 weight percent MoO$_3$.

Catalyst F was prepared the same as Catalyst E but using a 77.5 g. sample of the low sodium, ultrastable, large pore, crystalline aluminosilicate base and impregnating solutions containing 8.4 g. cobalt acetate and 24.2 g. ammonium molybdate. The catalyst had a nominal composition of 2.5 weight percent CoO and 20 weight percent MoO$_3$.

Catalyst G was prepared by impregnating 76 g. of the low sodium, ultrastable, large pore, crystalline aluminosilicate base with a solution comprising 28.9 g. of nickelous nitrate in 50 ml. of water and 21.9 g. ammonium molybdate in 50 ml. of water. The impregnated catalyst was dried, pelleted and calcined as above. The final catalyst had a nominal composition of 7.5 weight percent NiO and 18 weight percent $MoO_3$.

Catalyst H was prepared by impregnating 85 g. of a re-exchanged Davison ultrastable, large pore, crystalline aluminosilicate base having a sodium content of 0.19 weight percent, with a solution made by dissolving 19.4 g. of nickelous nitrate and 10.9 g. ammonium meta tungstate in 125 ml. water. The sample was dried at 250° F., blended with 4 percent Sterotex and pelleted. The pellets were calcined for 3 hours at 1000° F. The catalyst had a nominal composition of 5 weight percent NiO and 10 weight percent $WO_3$.

The hydrocracking tests consisted of processing a standard feed composition of 70% light catalytic cycle oil and 30% light virgin gas oil for a period of 1 to 2 weeks. The feed inspections for the standard feed composition, as well as for the light virgin gas oil component of the standard feed, are shown in Table I. Catalyst A was ground to 12–20 mesh granules and a 19 g. charge was placed in a small flow reactor. The catalyst was pretreated for about 21 hours at a temperature of 500° F. and a pressure of 1250 p.s.i.g. with hydrogen gas flowing at the rate of 32 s.c.f.h./lb. of catalyst. The standard feed composition was then introduced into the flow reactor and a pressure of 1250 p.s.i.g. maintained during the run. Operation was once-through with respect to both the standard feed and hydrogen. The temperature was adjusted to maintain a target conversion of about 77 weight percent. Both the liquid and gaseous product were analyzed using gas chromatographic methods and the temperature required for 77% conversion was calculated.

The experiment was repeated using the catalyst charges and space velocities shown in Table II. In the case of Catalyst B and Catalyst C, after completion of the pretreatment with hydrogen gas, the initial feed consisted of 100% light virgin gas oil rather than the standard feed. During the first 6 hours of operation, the temperature in the reactor was gradually increased from 500° F. to about 625° F. At this point the feed was changed to a 50–50 mixture of light virgin gas oil and standard feed, and the temperature was adjusted as needed to approach 77% conversion. Finally, after a total of 12 hours operation, a hydrocarbon feed consisting entirely of the standard feed was introduced into the reactor and the experiment continued as described above. The results of each experiment (using Catalysts A through H) are presented in Tables III through X.

These experiments clearly show that a more active hydrocracking catalyst is obtained when the composition consists entirely of the crystalline aluminosilicate material and hydrogenation components. Catalysts A and B, containing nominally only about 35% crystalline aluminosilicate material, require higher temperatures in order to achieve 77% conversion than the remaining catalysts which have no amorphous matrix base. Furthermore, the catalysts which have very low concentrations of alkali metal (less than about 0.2 weight percent sodium) are even more active than those having the higher concentrations of alkali metal. Therefore, the combination of very low alkali metal concentration and very high content of ultrastable, large pore, crystalline aluminosilicate material give the optimum catalysts in respect to hydrocracking activity.

TABLE I.—FEED INSPECTIONS

| | Feed | |
|---|---|---|
| | Standard | LVGO |
| Gravity, ° API | 27.5 | 34.4 |
| ASTM distillation, vol. percent overhead: | | |
| 0, ° F | 398 | 425 |
| 5, ° F | 454 | |
| 10, ° F | 475 | 495 |
| 30, ° F | 519 | 527 |
| 50, ° F | 546 | 549 |
| 70, ° F | 563 | 576 |
| 90, ° F | 614 | 626 |
| EP, ° F | 632 | 667 |
| Sulfur, wt. percent | 0.25 | 0.16 |
| Nitrogen, p.p.m. | 159 | 67 |
| Molecular weight | 209 | 232 |
| Refractive index (20° C.) | 1.5026 | 1.4734 |
| Molecular type, vol. percent: | | |
| Aromatics | 42.2 | 23.1 |
| Paraffins | 23.5 | 32.5 |
| Naphthenes | 34.3 | 44.4 |

TABLE II

| Catalyst: | Charge (grams) | Space velocity, Wo/hr./Wc |
|---|---|---|
| A | 19 | 1.38 |
| B | 38 | 1.38 |
| C | 38 | 1.38 |
| D | 19 | 1.38 |
| E | 19 | 1.38 |
| F | 19 | 1.38 |
| G | 19 | 1.38 |
| H | 18 | 1.46 |

TABLE III.—CATALYST A

| | Days on stream | | | | | | |
|---|---|---|---|---|---|---|---|
| | 1 | 2 | 7 | 8 | 9 | 12 | 13 |
| Temp., ° F | 697 | 703 | 711 | 706 | 708 | 710 | 699 |
| Hydrogen rate, M s.c.f.b | 12.6 | 12.8 | 12.1 | 11.9 | 12.0 | 12.8 | 13.1 |
| Conversion, wt. percent | 78.6 | 89.4 | 93.5 | 83.5 | 82.9 | 86.5 | 70.5 |
| Product distribution, wt. percent: | | | | | | | |
| Dry gas ($C_1$–$C_3$) | 3.6 | 3.5 | | 3.5 | 3.8 | 4.0 | 4.7 |
| Butane | 11.3 | 12.3 | | 12.0 | 13.7 | 12.5 | 12.2 |
| Pentane | 9.1 | 10.7 | | 11.3 | 10.0 | 10.1 | 8.1 |
| Light naphtha ($C_5$–180° F.) | 16.5 | 19.2 | | 16.9 | 16.8 | 17.2 | 14.9 |
| Heavy naphtha (180–380° F.) | 62.5 | 57.3 | | 59.3 | 58.7 | 59.2 | 63.1 |
| Iso/normal ratios: | | | | | | | |
| Butane | 1.71 | 1.72 | | 1.51 | 1.57 | 1.58 | 1.60 |
| Pentane | 9.14 | 9.18 | | 11.39 | 10.08 | 11.30 | 11.65 |
| Temp., ° F. for 77% conversion | 696.9 | 697.2 | 702.3 | 702.3 | 704.7 | 705.8 | 704.5 |

TABLE IV.—CATALYST B

| | Days on stream | | | |
|---|---|---|---|---|
| | 1 | 2 | 5 | 6 |
| Temp., ° F | 691 | 715 | 713 | 711 |
| $H_2$/HC, M s.c.f.b | 8.9 | 8.7 | 9.0 | 9.2 |
| Conversion, wt. percent | 84.6 | 85.7 | 71.0 | 68.3 |
| Product distribution, wt. percent: | | | | |
| Dry gas ($C_1$–$C_3$) | 8.3 | 5.4 | 5.5 | 5.5 |
| Butane | 19.4 | 15.2 | 12.9 | 13.4 |
| Pentane | 13.8 | 12.9 | 11.3 | 10.6 |
| Light naphtha ($C_5$–180° F.) | 17.1 | 19.4 | 18.3 | 18.6 |
| Heavy naphtha (180–380° F.) | 44.4 | 50.1 | 55.0 | 54.9 |
| Iso/normal ratios: | | | | |
| Butane | 1.81 | 1.86 | 1.86 | 1.76 |
| Pentane | 12.03 | 11.79 | 12.60 | 11.36 |
| Temp., ° F. for 77% conversion | 686.7 | 709.8 | 716.7 | 716.7 |

TABLE V.—CATALYST C

| | Days on stream | | | | | | | |
|---|---|---|---|---|---|---|---|---|
| | 1 | 2 | 5 | 6 | 7 | 8 | 9 | 12 |
| Temp., °F | 672 | 677 | 693 | 691 | 694 | 693 | 692 | 695 |
| $H_2/HC$, M s.c.f.b | 9.2 | 8.5 | 10.2 | 9.5 | 9.1 | 8.7 | 8.5 | 8.8 |
| Conversion, wt. percent | 66.8 | 66.5 | 83.5 | 77.6 | 76.0 | 75.4 | 73.1 | 78.5 |
| Product distribution, wt. percent: | | | | | | | | |
|   Dry gas ($C_1$-$C_3$) | 10.0 | 8.2 | 8.6 | 5.7 | 5.4 | 5.3 | 6.2 | 8.5 |
|   Butane | 23.9 | 18.8 | 17.1 | 14.0 | 14.7 | 15.6 | 16.7 | 16.5 |
|   Pentane | 15.7 | 11.9 | 12.0 | 12.5 | 12.9 | 14.1 | 13.6 | 13.6 |
|   Light naphtha ($C_6$-180° F.) | 15.1 | 15.5 | 18.1 | 18.9 | 18.7 | 16.9 | 17.2 | 17.3 |
|   Heavy naphtha (180-380° F.) | 38.3 | 48.6 | 47.2 | 51.9 | 51.3 | 51.1 | 49.3 | 46.1 |
| Iso/normal ratios: | | | | | | | | |
|   Butane | 1.99 | 2.08 | 2.04 | 1.67 | 1.77 | 1.46 | 1.78 | 1.71 |
|   Pentane | 6.77 | 11.13 | 10.85 | 11.10 | 1055 | 11.65 | 12.58 | 12.11 |
| Temp., °F for 77% conversion | 678.7 | 683.0 | 691.0 | 691.3 | 694.7 | 694.1 | 693.7 | 693.9 |

TABLE VI.—CATALYST D

| | Days on stream | | | | | | |
|---|---|---|---|---|---|---|---|
| | 4 | 5 | 6 | 7 | 8 | 11 | 12 |
| Temp., °F | 674 | 671 | 668 | 666 | 668 | 668 | 672 |
| Hydrogen rate, M s.c.f.b | 13.2 | 12.2 | 13.3 | 12.2 | 12.0 | 11.3 | 11.4 |
| Conversion, wt. percent | 95.2 | 87.0 | 81.2 | 74.9 | 77.0 | 69.0 | 79.6 |
| Product distribution, wt. percent: | | | | | | | |
|   Dry gas ($C_1$-$C_3$) | 5.8 | 3.5 | 3.5 | 3.2 | 3.5 | 3.2 | 3.0 |
|   Butane | 16.0 | 10.2 | 10.5 | 9.1 | 10.0 | 8.6 | 9.5 |
|   Pentane | 12.5 | 9.1 | 10.3 | 8.1 | 8.5 | 7.6 | 10.5 |
|   Light naphtha ($C_6$-180° F.) | 18.5 | 18.8 | 16.7 | 16.0 | 16.4 | 15.8 | 16.3 |
|   Heavy naphtha (180-380° F.) | 50.2 | 61.4 | 62.0 | 66.6 | 64.6 | 67.8 | 63.7 |
| Iso/normal ratios: | | | | | | | |
|   Butane | | 2.01 | 1.78 | 1.83 | 1.87 | 1.97 | 1.74 |
|   Pentane | | 8.82 | 9.78 | 9.38 | 8.71 | 11.41 | 10.82 |
| Temp., °F for 77% conversion | 666.0 | 665.8 | 667.4 | 667.5 | 668.0 | 672.0 | 669.7 |

TABLE VII.—CATALYST E

| | Days on stream | | | | |
|---|---|---|---|---|---|
| | 1 | 2 | 3 | 7 | 8 |
| Temp., °F | 659 | 669 | 665 | 671 | 674 |
| Hydrogen rate, M s.c.f.b | 12.4 | 12.2 | 12.4 | 11.9 | 12.2 |
| Conversion, wt. percent | 74.9 | 82.8 | 75.4 | 81.5 | 80.4 |
| Product distribution, wt. percent: | | | | | |
|   Dry gas ($C_1$-$C_3$) | 3.0 | 3.3 | 3.1 | 3.2 | 3.2 |
|   Butane | 8.6 | 9.1 | 8.7 | 9.0 | 9.5 |
|   Pentane | 7.2 | 9.2 | 9.0 | 8.6 | 9.4 |
|   Light naphtha ($C_6$-180° F.) | 15.7 | 16.5 | 15.9 | 16.5 | 16.2 |
|   Heavy naphtha (180-380° F.) | 68.5 | 64.9 | 66.3 | 65.7 | 64.7 |
| Iso/normal ratios: | | | | | |
|   Butane | 2.06 | 2.07 | 1.88 | 2.05 | 1.89 |
|   Pentane | 9.31 | 8.48 | 8.00 | 9.81 | 9.36 |
| Temp., °F for 77% conversion | 660.7 | 666.0 | 666.5 | 668.9 | 672.3 |

TABLE VIII.—CATALYST F

| | Days on stream | | | | | |
|---|---|---|---|---|---|---|
| | 5.5 | 6.5 | 7.5 | 8.5 | 12.5 | 13.5 |
| Temp., °F | 678 | 679 | 677 | 680 | 680 | 679 |
| Hydrogen rate, M s.c.f.b | 11.8 | 11.8 | 11.2 | 12.8 | 12.1 | 12.2 |
| Conversion, wt. percent | 78.7 | 76.5 | 71.6 | 81.1 | 79.4 | 75.5 |
| Product distribution, wt. percent: | | | | | | |
|   Dry gas ($C_1$-$C_3$) | 2.4 | 2.7 | 2.1 | 2.4 | 2.3 | 2.3 |
|   Butane | 9.8 | 9.5 | 7.7 | 9.4 | 9.2 | 9.4 |
|   Pentane | 9.7 | 9.2 | 8.2 | 9.3 | 10.0 | 9.8 |
|   Light naphtha ($C_6$-180° F.) | 16.8 | 16.2 | 16.0 | 17.1 | 16.6 | 16.3 |
|   Heavy naphtha (180-380° F.) | 64.3 | 65.4 | 69.0 | 64.8 | 64.9 | 65.2 |
| Iso/normal ratios: | | | | | | |
|   Butane | 1.71 | 1.73 | 1.70 | 1.76 | 1.56 | 1.57 |
|   Pentane | 7.56 | 7.11 | 7.06 | 7.22 | 7.49 | 7.87 |
| Temp., °F for 77% conversion | 676.7 | 678.0 | 679.3 | 679.2 | 678.7 | 680.2 |

TABLE IX.—CATALYST G

| | Days on stream | | | | | |
|---|---|---|---|---|---|---|
| | 2 | 5 | 8 | 9 | 12 | 13 |
| Temp., °F | 675 | 674 | 664 | 659 | 674 | 669 |
| Hydrogen rate, M s.c.f.b | 12.4 | 12.9 | 13.1 | 12.0 | 11.9 | 11.9 |
| Conversion, wt. percent | 96.1 | 95.8 | 76.2 | 63.5 | 86.6 | 80.9 |
| Product distribution, wt. percent: | | | | | | |
|   Dry gas ($C_1$-$C_3$) | 3.3 | 3.2 | 2.3 | 2.3 | 3.6 | 3.2 |
|   Butane | 12.0 | 11.5 | 8.3 | 7.4 | 12.5 | 11.5 |
|   Pentane | 11.8 | 11.4 | 8.6 | 7.7 | 10.9 | 10.1 |
|   Light naphtha ($C_6$-180° F.) | 20.7 | 19.4 | 14.7 | 14.5 | 17.5 | 16.6 |
|   Heavy naphtha (180-380° F.) | 55.2 | 57.5 | 69.1 | 71.1 | 58.5 | 61.6 |
| Iso/normal ratios: | | | | | | |
|   Butane | 1.97 | 2.02 | 1.96 | 1.87 | 1.90 | 1.92 |
|   Pentane | 7.53 | 7.87 | 7.34 | 6.58 | 7.64 | 7.41 |
| Temp., °F for 77% conversion | 665.5 | 665.0 | 665.9 | 667.7 | 668.5 | 666.6 |

TABLE X.—CATALYST H

| | Days on stream | | | | | | |
|---|---|---|---|---|---|---|---|
| | 2 | 5 | 6 | 7 | 8 | 9 | 12 |
| Temp., °F | 669 | 663 | 677 | 669 | 668 | 675 | 670 |
| Hydrogen rate, M s.c.f.b | 12.2 | 11.5 | 12.9 | 12.6 | 11.9 | 12.5 | 11.8 |
| Conversion, wt. percent | 82.6 | 60.8 | 90.5 | 67.8 | 71.8 | 86.5 | 72.7 |
| Product distribution, wt. percent: | | | | | | | |
| Dry gas ($C_1$–$C_3$) | 3.2 | | 3.8 | 3.2 | 3.1 | 2.7 | 2.9 |
| Butane | 10.6 | | 11.9 | 9.0 | 9.8 | 10.6 | 9.2 |
| Pentane | 9.7 | | 10.5 | 7.3 | 8.7 | 11.3 | 9.0 |
| Light naphtha ($C_6$–180° F.) | 16.6 | | 18.0 | 14.6 | 15.0 | 17.5 | 16.2 |
| Heavy naphtha (180–380° F.) | 62.9 | | 58.8 | 67.9 | 66.4 | 60.9 | 65.7 |
| Iso/normal ratios: | | | | | | | |
| Butane | 1.80 | | 1.95 | 1.86 | 2.19 | 1.68 | 1.61 |
| Pentane | 6.80 | | 7.13 | 6.19 | 5.85 | 6.72 | 6.05 |
| Temp., °F. for 77% conversion | 666.0 | 672.9 | 670.8 | 675.6 | 671.0 | 670.4 | 672.4 |

Although the catalytic composition of this invention has been described only in respect of specific examples, it is intended that the scope of the invention not be limited thereby but should only be limited in reference to the broad disclosures and appended claims.

What we claim is:

1. A hydrocracking catalyst consisting essentially of an ultrastable, large pore, crystalline aluminosilicate material containing less than about 1% alkali metal and having deposited thereon a hydrogenation component selected from the group consisting of the metals, oxides, and sulfides of the Group VIII elements of the Periodic Table.

2. The catalyst of claim 1 containing less than about 0.2 weight percent alkali metal.

3. The catalyst of claim 2 containing between about 0.1 and 10 weight percent of said hydrogenation component.

4. The catalyst of claim 3 wherein said Group VIII hydrogenation component includes cobalt.

5. The catalyst of claim 3 wherein said Group VIII hydrogenation component includes nickel.

6. The catalyst of claim 2 including a second hydrogenation component selected from the group consisting of the metals, oxides, and sulfides of the Group VI–B elements of the Periodic Table.

7. The catalyst of claim 6 where the amount of said second hydrogenation component is less than about 25 weight percent of the total catalyst.

8. The catalyst of claim 7 wherein said second hydrogenation component is selected from the group consisting of the metals, oxides, and sulfides of chromium, molybdenum and tungsten.

9. A hydrocracking catalyst consisting essentially of an ultrastable, large pore, crystalline aluminosilicate material containing less than about 0.2 weight percent sodium and impregnated with cobalt and molybdenum such that the nominal catalyst composition contains about 2.5% CoO and about 5% $MoO_3$.

10. A hydrocracking catalyst consisting essentially of an ultrastable, large pore, crystalline aluminosilicate material containing less than about 0.2 weight percent sodium and impregnated with nickel and tungsten such that the nominal catalyst composition contains about 5% NiO and about 10% $WO_3$.

11. A hydrocracking catalyst consisting essentially of an ultrastable, large pore, crystalline aluminosilicate material containing less than about 0.2 weight percent sodium and impregnated with nickel and molybdenum such that the nominal catalyst composition contains about 7.5% NiO and about 18% $MoO_3$.

References Cited

UNITED STATES PATENTS 3,264,208   8/1966   Plank et al. _____ 252—455 X
3,431,196   3/1969   Dobres et al. _____ 252—455 X CARL F. DEES, Primary Examiner U.S. Cl. X.R.

208—111

UNITED STATES PATENT OFFICE
CERTIFICATE OF CORRECTION

Patent No. 3,677,972          Dated July 18, 1972

Inventor(s) Louis C. Gutberlet and Ralph J. Bertolacini

It is certified that error appears in the above-identified patent and that said Letters Patent are hereby corrected as shown below:

Column 4, line 16, "90°F." should be --90°C.--.

Column 4, line 28, "CaO" should be --CoO--.

Column 7, Table V, "1055" should be --10.55--.

Column 7, Table V, "75.4" should be --74.5--.

Signed and sealed this 12th day of December 1972.

(SEAL)
Attest:

EDWARD M. FLETCHER, JR.
Attesting Officer

ROBERT GOTTSCHALK
Commissioner of Patents